April 23, 1968 P. J. WYNNE 3,379,818
ELECTRIC ARC FURNACE
Filed May 31, 1966
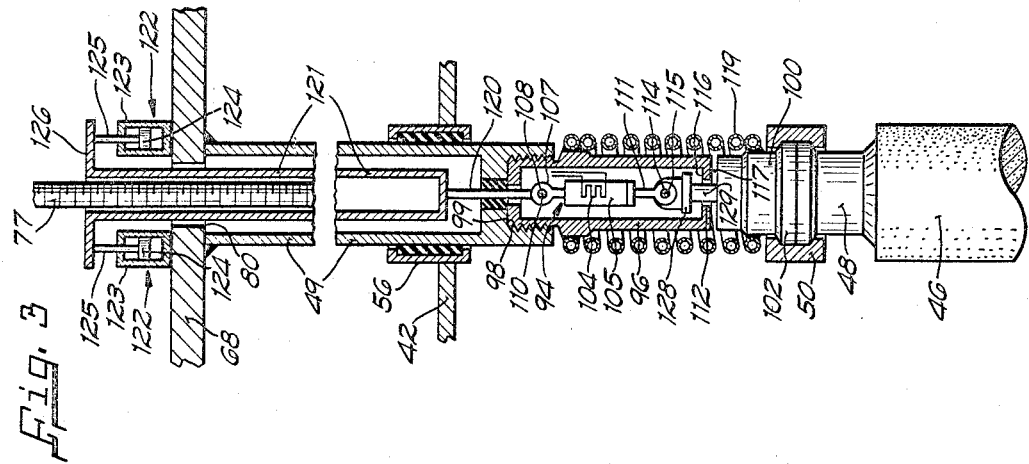
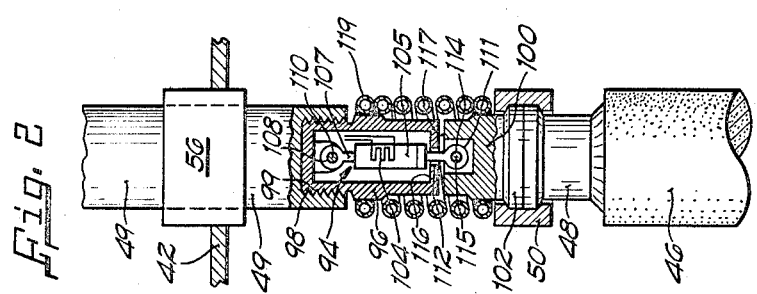
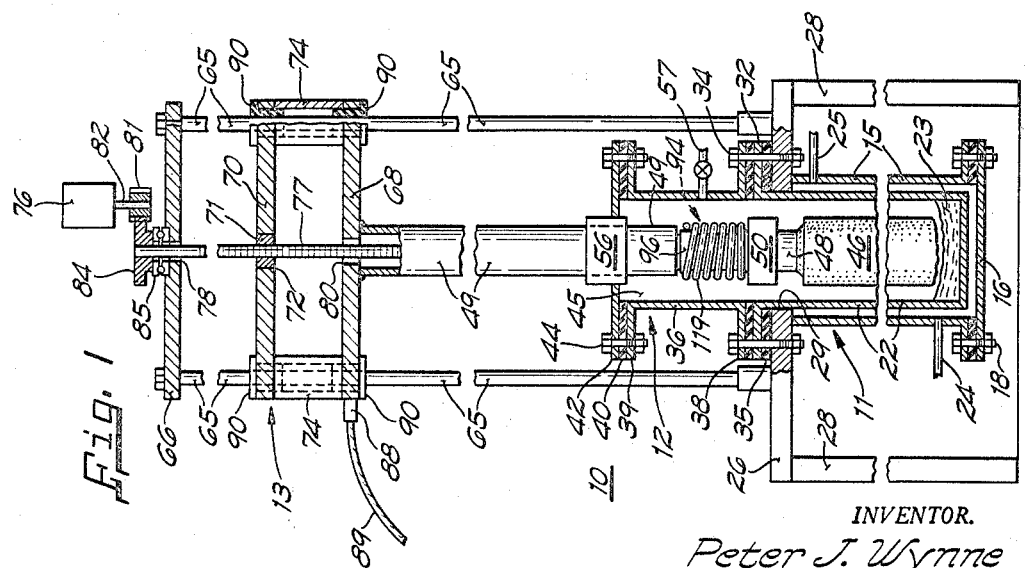
INVENTOR.
Peter J. Wynne
BY Fred Wiviott
Attorney United States Patent Office 3,379,818
Patented Apr. 23, 1968

3,379,818
ELECTRIC ARC FURNACE
Peter J. Wynne, Pittsburgh, Pa., assignor, by mesne assignments, to Lectromelt Corporation, Pittsburgh, Pa., a corporation of Delaware
Filed May 31, 1966, Ser. No. 554,647
13 Claims. (Cl. 13—14)

This invention relates to electric arc furnaces and, more particularly, to apparatus for weighing the electrode in a controlled atmosphere consumable electrode type electric arc furnace.

Consumable electrode electric arc furnaces are widely used in such applications as the melting of refractory metals, of which titanium is an example. Such furnaces, in general, include a sealed chamber wherein the consumable electrode is progressively melted on a controlled atmosphere and the resulting molten metal collected in a mold or crucible to form an ingot. Melting is accomplished by means of an arc which is drawn between the consumable electrode and the ingot and which is sustained by a relatively large direct current. As the ingot forms, the electrode length gradually decreases so that it must be lowered in order to maintain the proper arc length for the desired melting conditions.

Near the conclusion of the melting operation, additional heat is provided to the upper end of the ingot to control solidification. This procedure, called "hot topping" reduces the undesirable shrinkage cavity which normally forms at the upper end of the ingot. This cavity, called pipe, must be removed thereby reducing the furnace yield.

Heretofore in the operation of consumable electrode controlled atmosphere arc furnaces, the furnace operator determined when to initiate the hot topping procedure by visually observing the position of the electrode through a viewing apparatus. This method was not wholly satisfactory because it was subject to human variations and because it could not take into consideration variations in electrode density resulting from porosity, pipe and the like.

It is an object of the invention to provide means for determining the weight of the remaining portion of a consumable electrode in electric arc furnaces.

A further object of the invention is to provide means for determining the initiation point for the hot topping process in a consumable electrode controlled atmosphere electric arc furnace.

These and other objects of the instant invention will become more apparent from the detailed description thereof taken with the accompanying drawings, in which:

FIG. 1 is a side elevational view, partly in section, of a consumable electrode electric arc furnace incorporating the instant invention;

FIG. 2 is a fragmentary view, partly in section, of the furnace shown in FIG. 1 and which illustrates the instant invention; and FIG. 3 illustrates an alternate embodiment of the instant invention.

In general terms, the invention comprises an electric arc furnace having a sealed furnace body, a consumable electrode, electrode drive means for moving the electrode relative to the furnace body, weighing means coupled between the drive means and the electrode and having a maximum capacity which is a fraction of the initial weight of the electrode, and means for supporting the electrode when its weight is in excess of the capacity of the weighing means.

Referring now to the drawings in greater detail, FIG. 1 shows a consumable electrode, controlled atmosphere, electric arc furnace designated by the reference numeral 10 and having a crucible section 11, a throat section 12 and an electrode drive assembly 13.

The crucible section 11 includes an outer, substantially cylindrical shell 15 having a bottom closure member 16 which is affixed thereto in a hermetically sealed relation by means of bolts 18 to provide a cooling jacket for a crucible 22 disposed therein and which receives an ingot 23 formed from the material being melted. The shell 15 is provided with a cooling fluid inlet pipe 24 and an outlet pipe 25.

A horizontal mounting plate 26 is supported adjacent the upper end of the shell 15 by vertical columns 28 and has a central aperture 29 for receiving the upper end of crucible 22. A flange 32 extends outwardly from the upper end of the crucible 22 and is affixed to the upper surface of the mounting plate 26 by bolts 34. A gasket 35 is provided around the periphery of the aperture 29 and below the flange 32.

The throat section 12 of the furnace 10 includes an outer cylindrical housing 36 which is substantially coradial with the crucible 22 and which is affixed at the upper end thereof by bolts 34 which engage an outwardly extending flange 38 on its upper end. A second flange 39 extends outwardly from the upper end of the throat housing 36 for receiving an annular gasket 40 and a cover plate 42, which are attached to the flange 39 by bolts 44. The cover plate 42 forms a closure for the hollow assembly 45 comprising the crucible 22 and the throat housing 36. An electrode 46 is disposed within the hollow assembly 45 and has a stub 48 integrally formed at its upper end for releasable attachment to a hollow electrode ram 49 by a clamp 50. The electrode ram 49 slidably passes through a sealing bushing 56 in the cover plate 42, and which provides a fluid-tight seal for the enclosure 45 and, in addition, electrically insulates the ram 49 from the cover plate 42.

A pipe 50 is connected to the throat section 36 and communicates with the interior of the assembly 45 for placing the latter in communication with an evacuator or source of inert gas if a partial vacuum or inert gas atmosphere is required during the melting operation.

The electrode drive assembly 13 is supported above the cover plate 42 by vertically extending rods 65 whose lower ends are affixed to the plate 42 and whose upper ends support a top plate 66. The drive assembly includes a first generally triangular plate 68 which is affixed to the upper end of the electrode ram 49 and a second generally rectangular plate 70 disposed vertically above the plate 68 and having a nut 71 affixed in an aperture 72 provided therein and concentric with the ram 49. A tubular member 74 is slidably disposed on each of the support rods 65 and each is affixed at its lower end to the first plate 68 and at its upper end to the second plate 70 so that the plates 68 and 70 are coupled for sliding vertical movement on the support rods 65.

The electrode drive assembly 13 also includes a drive motor 76 suitably mounted above the top plate 66 and a drive screw 77 which threadably engages the nut 71 in the second plate 70 and extends vertically downward through apertures 78 and 80 in plates 66 and 68, respectively, and into the hollow interior of the electrode ram 49. A pinion 81 is carried on the output shaft 82 of motor 76 and engages a gear 84 affixed to the upper end of the screw shaft 77 and rotatably mounted about the aperture 78 in plate 66 by a suitably bearing assembly 85.

Electrical energy is supplied to the electrode 46 through a terminal 88 mounted on plate 68 and which is constructed and arranged to receive a flexible conductor 89. Current flows from the plate 68 through the electrode ram 49, the clamp 50, the stub 48 and to the electrode 46. Insulating bushings 90, of any suitable material, insulate the guide rod 65 from the plates 68 and 70 and the tubes 74.

As those skilled in the art will appreciate, the motor 76 is controlled in accordance with electrode voltage and current conditions by means which are not shown and which are well known in the art. For example, one such method is shown and described in copending application Ser. No. 456,157, filed May 17, 1965 and assigned to the assignee of the instant invention.

The motor 76 is caused to rotate in a direction which maintains the arc between the electrode 46 and the ingot 23 at a relatively uniform length. Thus, it can be seen from FIG. 1 that rotation of motor 76 will rotate the screw shaft 78 through the agency of the pinion 81 and the gear 84. As the screw shaft 77 rotates, relative movement will be produced between it and the nut 71 affixed to the base 70. This will cause the plate 70 to move in a direction governed by the rotation of the shaft 77 and this, in turn, will be transmitted to the electrode 46 through the agency of the tubular members 74, the plate 68 and the electrode ram 49.

Referring now to FIG. 2, which shows a weighing apparatus or load cell 94 disposed in an assembly 95 which couples the electrode ram 49 to the clamp 50. The coupling assembly 95 includes a first hollow housing member 96 which encloses the load cell 94 and has external threads 98 formed at its upper end for engaging a threaded aperture 99 formed in the lower end of the ram 49. In addition, the coupling assembly 95 also includes a separate second member 100 disposed vertically below the member 96 and whose lower end 102 mates with the upper end of the electrode stub 48 and is secured thereto by the clamp 50.

The load cell 94 may be of any well known type, such as a bonded wire strain gauge 104 affixed to the cylindrical metallic block 105. A first stem 107 extends upwardly from the block 105 and has an eye 108 formed at its upper end for being affixed by a pin 110 to the housing 96 and a second stem 111 extending downwardly through an opening 112 in the lower end of the housing 96. The second stem 111 also has an eye 114 at its lower end for being affixed by a pin 115 to the second coupling member 100. As a result, the electrode 46, the stub 48, the clamp 50 and the coupling member 100 are connected to the ram 49 through the load cell 94.

When the cell 94 is unloaded, a gap 117 is shown to exist between the lower end of the cylindrical block 105 and the lower inner surface 116 of the housing 96. When the electrode is coupled to the clamp 50 to load the cell 94, the block 105 will elongate until it "bottoms out." This brings the bottom of the block 105 into engagement with the surface 116 so that the excess load is taken up by the housing 96 in parallel with the block 105.

At the commencement of a furnace melting operation, most of the weight of the electrode 46 and its associated structure are supported by the housing 96 and the remaining smaller portion by the load cell 94. As the electrode 46 melts and the metal therein transfers to the ingot 23, the weight supported by the housing 96 will decrease while that supported by the block 105 will remain constant until such time as the weight is less than a predetermined value whereupon the block 105 will pull away from the surface 116 and the load cell 94 will support the total weight. This predetermined value is the rating of the load cell.

It is desirable to utilize a load cell whose rating is substantially less than the total weight of the electrode because the accuracy of load cells, such as that illustrated in FIG. 2, is in the order of ±0.1% of its maximum capacity. Since consumable electrodes of the type described, weigh in the order of 30,000 pounds, a load cell designed to support the full electrode weight would have an accuracy in the order of ±300 pounds. This margin of error is too large to accurately determine when the hot topping operation is to be initiated. In the illustrated embodiment, however, because the load cell 94 does not pick up the full weight of the electrode and its related assembly until the total weight has been reduced to a fraction of its initial value, e.g., in the order of 2,000 pounds, a cell accuracy of ±20 pounds can be obtained and this is well within acceptable limits.

Those skilled in the art will appreciate that the bonded wire strain gauge 104 will be coupled to a suitable meter which is calibrated in terms of weight.

When the operator has determined that the weight of the electrode and its associated structure has decreased to a predetermined value, as indicated by the load cell 94, additional heat will be provided to the upper end of the crucible to control the solidification and thereby reduce the undesirable shrinkage cavity or pipe. One method of accomplishing this result is to provide additional current through the electrode 46.

In order to provide a current path between the ram 49 and the electrode 46 and around the load cell 94 and the gap which may exist between the housing 96, the member 100, a helically wound resilient conductive tube 119 is disposed coaxially with the coupling assembly 95 and is electrically connected at its upper end to the housing 96 and at its lower end to the member 100.

FIG. 3 shows a modified form of the invention wherein the upper end of the load cell 94 is coupled by a rod 120 to the lower end of a tubular member 121 disposed coaxially within the ram 49 and extending upwardly to pass freely through the opening 86. The upper end of the tube 121 is supported by a plurality of hydraulic assemblies 124 each having a cylinder 123 mounted on the upper surface of the plate 68 and a piston 124 having an upwardly extending stem 125 for engaging the underside of a flange 126 extending outwardly from the tube 121. The lower end of the load cell 94 is coupled to a disc-shaped member 128 disposed within the housing 96 and affixed to the coupling member 100 by a narrow neck portion 129 extending through the opening 112.

The hydraulic assembly 122 is constructed and arranged to support in an elevated position only that fraction of the total electrode weight which corresponds to the rating of the load cell 96, e.g., in the order of 2,000 pounds. Thus, when the electrode 46 is initially attached to the clamp 50, the total weight will exceed the lifting capacity of the hydraulic assembly 122 so that the member 124 will rest on the lower inner surface 116 of housing 96 to support substantially all of the weight of the electrode. After substantially all of the electrode has melted, the supported weight will fall within the load cell rating and the hydraulic assembly 122 will raise the member 124 away from the surface 116 so that the load cell will register the total weight. As a result, the commencement point for the hot topping operation can be determined.

While the invention has been shown and described with respect to one particular type of weighing apparatus, those skilled in the art will appreciate that other types may also be employed. In addition, while only a few embodiments of the invention have been shown and described, it is not intended to be limited thereby but only by the scope of the appended claims.

I claim:

1. In an electric arc furnace, the combination of, a sealed furnace body, a consumable electrode extending into said furnace body, electrode drive means coupled to said electrode for moving the same relative to said furnace body, weighing means having a maximum capacity which is a fraction of the initial weight of said electrode, sad weighing means being coupled between said drive means and said electrode so that the weight of said electrode may be determined, and first means for supporting said electrode when its weight is in excess of the capacity of said weighing means.

2. The arc furnace set forth in claim 1 wherein said weighing means includes support means coupled to said electrode for supporting said electrode when the weight thereof does not exceed the capacity of said weighing means.

3. The arc furnace set forth in claim 2 wherein said first means is engageable by said support means when the capacity of said weighing means is exceeded so that the weight of said electrode is taken up by said first means.

4. The arc furnace set forth in claim 3 wherein said first means and said support means are mounted on said electrode drive means and said support means is displaceable towards said furnace in proportion to the weight of said electrode to move said electrode into engagement with said first means when the capacity of said weighing means is exceeded.

5. The arc furnace set forth in claim 4 wherein said support means includes a load cell.

6. The arc furnace set forth in claim 4 wherein said support means comprises hydraulic means having piston means mounted on one of said electrode and drive means and cylinder means mounted on the other one thereof wherein the capacity of said hydraulic means to support said electrode above said first means is substantially equal to the capacity of said weighing means.

7. The arc furnace set forth in claim 6 wherein said support means includes a load cell.

8. The arc furnace set forth in claim 4 wherein said weighing means includes a load cell and said support means comprises a member elongatable in response to the weight of said electrode and means mounted on said member for producing an electrical quantity functionally related to said deformation.

9. The arc furnace set forth in claim 1 wherein said weighing means includes a load cell coupled between said electrode and said drive means, said weighing apparatus being operative to hold said electrode out of engagement with first means when the weight thereof does not exceed said capacity.

10. The arc furnace set forth in claim 1 wherein said electrode drive means includes a fixed portion mounted on said furnace body and a movable portion mounted on said fixed portion and motive means mounted on said fixed portion and coupled to said movable portion for moving the latter relative to said furnace body, said first means being carried by said movable portion, said weighing means being disposed between said movable portion and said electrode.

11. The arc furnace set forth in claim 10 wherein said movable portion includes terminal means and conductive means for conducting electrical energy from said terminal means to said electrode, said conductive means including flexible coupling means connected to said electrode and to said movable portion for conducting electrical energy around said weighing means.

12. The arc furnace set forth in claim 5 wherein said electrode drive means includes a fixed portion mounted on said furnace body and a movable portion mounted on said fixed portion and motive means mounted on said fixed portion and coupled to said movable portion for moving the latter relative to said furnace body, said first means being carried by said movable portion, said weighing means being disposed between said movable portion and said electrode.

13. The arc furnace set forth in claim 12 wherein said movable portion includes terminal means and conductive means for conducting electrical energy from said terminal means to said electrode, said conductive means including flexible coupling means connected to said electrode and to said movable portion for conducting electrical energy around said weighing means.

References Cited

UNITED STATES PATENTS

| | | | |
|---|---|---|---|
| 2,890,368 | 6/1959 | Boron et al. | 13—12 X |
| 2,956,098 | 10/1960 | Gruber et al. | 13—31 X |
| 3,179,734 | 4/1965 | Karl-Georg et al. | 13—12 |
| 3,188,376 | 6/1965 | Lyman | 13—31 |
| 3,196,308 | 7/1965 | Koncewicz | 13—9 X |

BERNARD A. GILHEANY, *Primary Examiner.*

H. B. GILSON, *Assistant Examiner.*